Aug. 9, 1949.   E. F. ATTULA   2,478,621
BAIT HOLDER AND DISPENSER
Filed Feb. 19, 1946
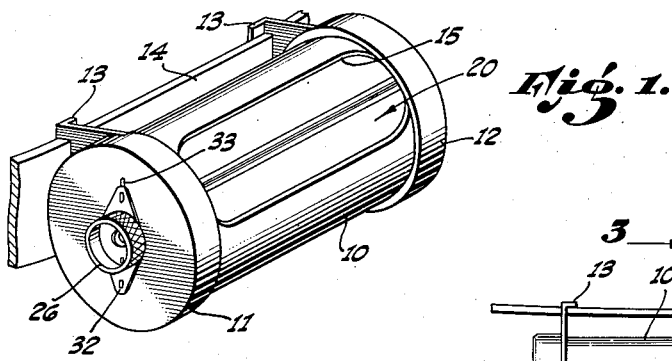
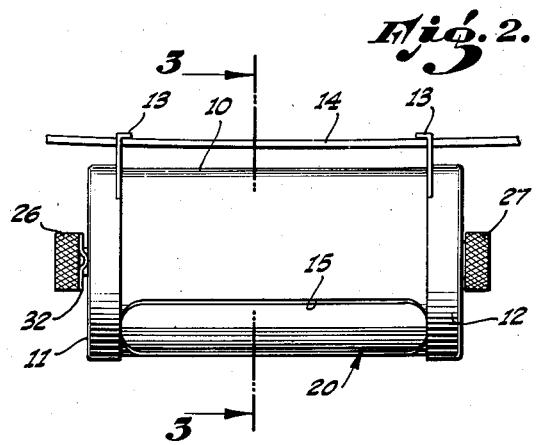
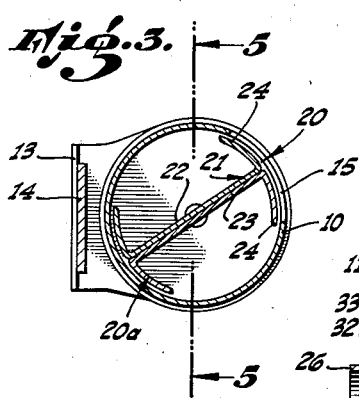
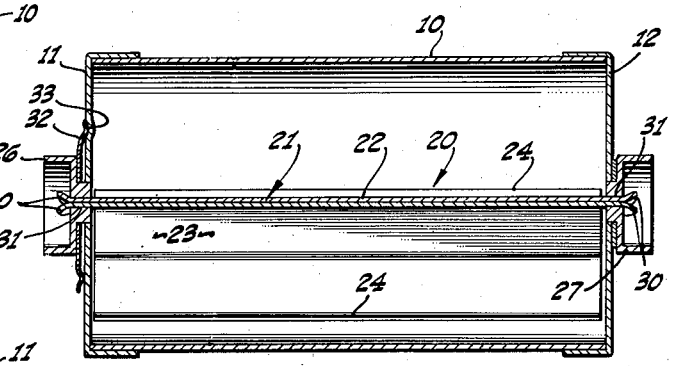
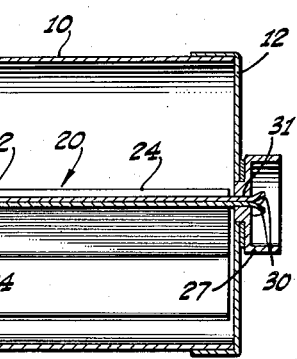
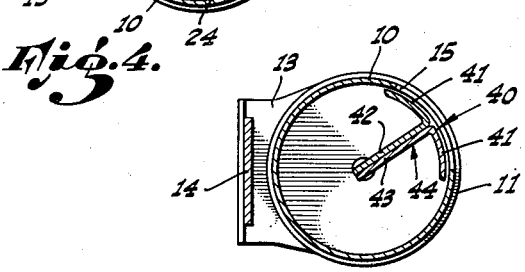
ERNST FRED ATTULA,
INVENTOR.
BY
ATTORNEY.

Patented Aug. 9, 1949

2,478,621

UNITED STATES PATENT OFFICE 2,478,621

BAIT HOLDER AND DISPENSER

Ernst Fred Attula, Los Angeles, Calif.

Application February 19, 1946, Serial No. 648,672

6 Claims. (Cl. 220—22)

My invention relates generally to bait holders, and more particularly to bait holders designed to hold worms, grasshoppers, salmon eggs, and similar types of bait, and to keep them alive and fresh until they are required for use by the fisherman.

While containers designed to be used as bait holders have long been known and used by fishermen, these holders have generally been clumsy, inconvenient to use, or have too readily permitted the escape of the more active types of bait. Fishermen have long desired a bait holder which could be easily and conveniently carried so that it was out of the way when not needed, and yet readily accessible when needed. In addition, the bait holder should retain the bait in its live condition, without requiring special treatment or preparation of the bait.

It is therefore a major object of my invention to provide a bait holder which is light in weight and readily carried by the fishermen while fishing.

It is another object of my invention to provide a bait holder which keeps the bait alive and in good condition over an extended period of time.

It is a further object of my invention to provide a bait holder in which the bait may be easily inserted, and from which the bait may be quickly and conveniently removed.

It is still another object of my invention to provide a bait holder in which the possibilities of loss of bait are materially reduced.

It is still a further object of my invention to provide a bait holder which may carry different kinds of bait without intermingling them so that the fisherman may have a ready choice of the type of bait he desires to use.

These and other objects of my invention will become apparent from the following description of a preferred and optional form thereof, and from the drawings illustrating those forms in which:

Fig. 1 is a perspective view of my bait holder illustrating how it may be held by the belt of a fisherman;

Fig. 2 is a plan view of the holder as it would be worn by the fisherman;

Fig. 3 is a cross-sectional view taken at 3—3 in Fig. 2, with the aperture in the holder closed;

Fig. 4 is a view similar to Fig. 3 with the aperture open;

Fig. 5 is a sectional view taken at 5—5 in Fig. 3; and

Fig. 6 is a cross-sectional view similar to Fig. 3 and illustrating an optional form of construction.

Referring now to the drawings, and particularly to Fig. 1 thereof, the numeral 10 indicates a cylindrical container, preferably of metal, and of a size adapted to be conveniently carried on a belt. The container is closed at each end by caps 11 and 12 which fit over the outside of the container 10, and are provided with belt loops 13 designed to fit over a belt 14, such as is customarily worn by men. The cylindrical container 10 is provided with an aperture 15 which extends the entire length of the container between the caps 11 and 12, and is preferably located in the upper, forward quadrant of the container. In this specification and claims, it is to be understood that the expression "forward" means in a direction away from the belt loops 13, this being the direction as seen by a person wearing the device. The width of the aperture 15 is such that the fisherman may readily insert his fingers through it to remove bait from the interior of the container 10, and the aperture should thus be approximately one inch wide as a minimum. The corners of the aperture 15 may be rounded for appearance and convenience in manufacturing; and the caps 11 and 12 may be tightly attached to the container 10 so that a water-proof joint is provided, if desired, but this latter feature is not necessary and adds to the cost of manufacture.

To prevent the accidental loss of bait, a closure 20 is provided for the aperture 15; and to permit the carrying of two different kinds of bait without intermingling them, a partition 21 is provided which extends diametrically across the container 10, as seen in Fig. 3. The closure 20 and the partition 21 may conveniently be combined in one unit, and in the form shown in Fig. 3, this has been done. In this form, the partition 21 is formed of two pieces of metal 22 and 23, each extending substantially completely and diametrically across the container 10, with the outer edges of the pieces bent substantially perpendicularly to form flanges 24 which in turn comprise the closure 20. Each of the portions of the partition 21 thus comprises a web 22 or 23 having flanges 24 at the edges thereof to form channel-like sections; and the webs are placed back to back and are held together by riveting, welding, or other suitable manner to form the member shown.

The webs 22 and 23 extend the entire length of the container 10, and their width is such that they may be rotated within the container without binding against it. The flanges 24 are preferably formed on arcs of a circle concentric with the center of the container 10, and a slight amount of clearance is left between the flanges 24 and the container, as shown in Figs. 3, 4 and 6. Since flanges 24 extend along both edges of partition 21, a second closure 20a is thus formed on the opposite edge of the partition; and by rotating the partition, the closure 20 may be moved from the aperture 15 to permit access to the compartment formed by the container 10 and the web 22. As the partition 21 is further rotated, closure 20a will be aligned with the aperture 15, and the holder will again be closed. Continued rotation will permit access to the compartment formed by the container 10 and the web 23, or the direction of rotation may be reversed, so that the first compartment is again opened.

For ease in rotating the partition 21, I provide knurled knobs 26 and 27 on the outside of caps 11 and 12, respectively. The knobs 26 and 27 are of a convenient size to be grasped by the fingers for rotation whenever it is desired to open and close the holder; and they may be conveniently attached to the partition 21 by forming central ears 30 on the webs 22 and 23, which may be extended through slots 31 in the central portion of the knobs, and then spread apart to hold the latter firmly to the partition. This method of construction is shown in Fig. 5, where it will be seen that rotation of either of the knobs 26 or 27 will rotate the partition 21 and the flanges 24 to open and close the holder. While other methods of construction may be used, I have found this to be a very simple and inexpensive form, and one which permits a very satisfactory device to be made at a minimum cost.

To retain the partition 21 in a position so that the closure 20 is aligned with the aperture 15 to prevent the accidental loss of bait, I prefer to provide a spring member 32 attached to the knob 26 for rotation therewith. This spring member bears against the cap 11, and the latter is provided with a pair of detents 33 into which the ends of the spring member may fit and be yieldably held against rotation. The detents 33 and the spring member 32 are so located with respect to the partition 21 that the spring member fits into one or both of the detents when the closure 20 or 20a is aligned with the aperture 15.

With the device herein disclosed, a fisherman may fill the two compartments of the bait holder with the desired types of bait, and then close the container by rotating one of the knobs 26 and 27 until the spring member 32 fits into the detent 33, at which time the aperture 15 will be closed by the closure 20 or 20a. The holder may then be attached at the waist of the fisherman by passing his belt 14 through the loops 13, and the holder is carried so that it and its contents are instantly available at all times, without in any way hampering the movements of the fisherman. The slight amount of clearance between the flanges 24 and the container 10 prevents the flanges from binding against the container; and at the same time permits circulation of a slight amount of air through the container to aid in maintaining bait such as "angleworms," in a live and healthy condition. By dividing the interior of the container into two or more compartments, different types of bait may be carried without being intermingled, and it is thus a simple matter to select the desired type of bait. By rotating one of the knobs 26 and 27, the aperture 15 is uncovered, and one of the compartments formed by the partition 21 is brought into view so that the fisherman may select the particular bait desired and remove it for use. Further rotation of the knob until the spring member 32 engages the detent 33 will close the aperture 15 to prevent the accidental loss of bait, the aperture remaining closed until such time as one of the knobs is rotated.

In Fig. 6 I have shown an optional form which may be used when only one type of bait is to be carried, and only a single compartment is desired within the container 10. In this form, the exterior construction of the holder is substantially identical with that of the form previously described, the cylindrical container 10 being closed by caps 11 and 12 carrying belt loops 13, and having an aperture 15 located in the same position as that of the preferred form. A rotatable closure 40 is adapted to cover the aperture 15, and is formed of a pair of flange members 41, similar to the flange members 24, attached to web members 42 and 43. These two webs are mounted back to back to provide a rotatable partition 44 somewhat similar to the partition 21, but approximately half as wide. The partition 44, like the partition 21, extends substantially the entire length of the container 10, but instead of extending from one side of the container to the other, it extends only to the center thereof. The webs 42 and 43 are provided with ears 30 (not shown) and these ears are attached to the knurled knobs 26 and 27, as in the previously described form. A spring member 32 and a detent 33 are attached to the knob 26, as in my preferred form, but instead of having two positions 180° apart where the knob is yieldably held against further rotation, only a single position is provided, corresponding to the aligning of the closure 40 with the opening 15. The container 10 may thus be opened by rotation of either of the knobs 26 and 27, as in my preferred form; and as the knob is rotated, the partition 44 acts to move the contents of the container toward the aperture 15 so that as the amount of bait is decreased, that remaining is still readily accessible.

While generally my preferred form, having the two compartments, will be favored by fishermen, under certain circumstances the optional form having the single compartment may be desired. With either form, however, the bait may be readily seen and selected by the fisherman, and there there is no necessity of tipping the holder to remove the bait or taking whichever piece of bait happens, by chance, to emerge from the holder. The rotation of the partition turns over the bait and the material in which it is packed so that there is no danger of the bait's being buried and overlooked. In addition, while a small clearance is left between the flanges 24 and the container 10, this clearance is small enough so that worms and other bait may be cut to the desired length by holding them in the aperture 15 while rotating one of the knobs 26 and 27.

It will thus be seen that I have provided a lightweight, inexpensive, bait holder of superior design, and while I have shown a preferred and optional form of my invention, I do not wish to be limited to the particular form or arrangement of parts herein described and shown, except as covered by my claims.

I claim:

1. A holder of the type described which includes: a cylindrical container having an aperture in one side extending a substantial portion of its length; a pair of caps each completely closing one end of said cylinder; a partition extending the length of said cylinder and parallel to the axis thereof, said partition being rotatable about said axis; a pair of oppositely extending flanges along the edge of said partition and substantially perpendicular to the latter, said flanges being substantially parallel to the walls of said cylinder, but separated at slight distance therefrom, and being of a sufficient width to close said aperture when aligned therewith; a knob rotatably attached to one of said caps and concentric with said cylinder; means connecting said partition to said knob, whereby said partition and said flanges may be rotated by rotation of said knob; and a spring pressed detent device adapted to yieldably hold said knob and said partition so that said aperture is closed by said flanges, but capable of being released by a relatively small torque applied to said knob.

2. A holder of the class described which includes: a cylindrical container having an aperture in one side extending a substantial portion of its length; a pair of caps each completely closing one end of said cylinder; a partition extending the length of said cylinder and parallel to the axis thereof, said partition extending from the inner surface of said cylinder to said axis and being rotatable about the latter; a pair of oppositely extending flanges along the outer edge of said partition and substantially perpendicular to the latter, said flanges being substantially parallel to the walls of said cylinder but separated a slight distance therefrom, and being of sufficient width to close said aperture when aligned therewith; a knob rotatably attached to one of said caps and concentric with said cylinder; means connecting said partition to said knob, whereby said partition and said flanges may be rotated by rotation of said knob; and a spring pressed detent device adapted to yieldably hold said knob and said partition so that said aperture is closed by said flanges.

3. A holder of the class described which includes: a cylindrical container having an aperture in one side extending a substantial portion of its length; a pair of caps each completely closing one end of said cylinder; a partition extending the length of said cylinder and parallel to the axis thereof, said partition extending from a point at the inner surface of said cylinder, through the axis thereof, and to a point at said inner surface substantially diametrically opposite said first point, whereby said container is divided into a pair of compartments, said partition being rotatable about said axis; a pair of oppositely extending flanges along each side edge of said partition and substantially perpendicular to the latter, said flanges being substantially parallel to the walls of said cylinder, but separated a slight distance therefrom, the flanges along each edge of said partition being of sufficient width to close said aperture when aligned therewith; a knob rotatably attached to one of said caps and concentric with said cylinder; means connecting said partition to said knob, whereby said partition and said flanges may be rotated by rotation of said knob; and a spring pressed detent device adapted to yieldably hold said knob and said partition so that said aperture is closed by either of said pairs of flanges.

4. A holder of the type described which includes: a cylindrical container having an aperture in one side thereof extending a substantial portion of its length; a pair of caps each completely closing one end of said container; an ear formed on each of said caps to receive a strap-like supporting member; a single radially extending partition member rotatably mounted within said container and extending the length thereof, said partition being formed of a pair of co-extensive sheet-like members placed together, with their outer edges bent to form oppositely directed flanges, each of said flanges having a width substantially equal to one-half the width of said aperture of said container, whereby said flanges cooperate to form a closure member adapted to completely close said aperture, said flanges being substantially parallel to the inner walls of said container but spaced a slight distance therefrom; a knob rotatably mounted in each of said caps in the center thereof; an axially projecting ear formed on each of said sheet-like members, said ears extending through axially extending slots in said knobs to attach said members forming said partition to said knobs, whereby said partition is rotatably supported by said knobs; and a radially extending leaf spring attached to one of said knobs for rotation with the latter, the plane of said spring being parallel to the plane of the adjacent cap, and the end of said spring bearing against said cap and adapted to enter depressions in the latter, whereby a detent is provided which tends to maintain said partition in a predetermined position.

5. A holder as described in claim 4 in which said partition extends from the axis of said container to one side thereof, to form a single compartment within said container having a volume substantially equal to that of said container.

6. A holder as described in claim 4 in which said partition extends diametrically across said container from one side thereof to the other, to form two accessible compartments therein, each having a volume substantially equal to one-half that of said container.

ERNST FRED ATTULA.

REFERENCES CITED

The following references are of record in the file of this patent:

UNITED STATES PATENTS

| Number | Name | Date |
|---|---|---|
| 503,722 | Lewis | Aug. 22, 1893 |
| 1,412,943 | Kennedy | Apr. 18, 1922 |
| 1,531,358 | Thompson et al. | Mar. 31, 1925 |
| 1,628,133 | Ferst | May 10, 1927 |
| 2,028,825 | Christensen | Jan. 28, 1936 |
| 2,236,224 | Raschkind | Mar. 25, 1941 |

FOREIGN PATENTS

| Number | Country | Date |
|---|---|---|
| 351,368 | France | July 13, 1905 |